(12) United States Patent
Hao et al.

(10) Patent No.: US 6,946,815 B1
(45) Date of Patent: Sep. 20, 2005

(54) SWITCH FOR A VARIABLE-SPEED INDUCTION MOTOR

(76) Inventors: Chung-Hsin Hao, No. 22-2, Sec. 2, Chang-An Rd., Hsi-Tun Dist., Taichung City (TW); Jui-Li Lin, No. 20, Alley 23, Lane 118, Kao-Yuan Rd., Lung-Ching Hsiang, Taichung Hsien (TW)

(*) Notice: Subject to any disclaimer, the term of this patent is extended or adjusted under 35 U.S.C. 154(b) by 0 days.

(21) Appl. No.: 10/937,653

(22) Filed: Sep. 9, 2004

(51) Int. Cl.[7] .............................. H02P 1/26; H02P 5/28; H02P 1/38
(52) U.S. Cl. ..................... 318/772; 318/773; 318/779; 318/727; 318/700; 318/800; 318/807
(58) Field of Search ................................ 318/772–780, 318/807–832

(56) References Cited

U.S. PATENT DOCUMENTS

| | | | | |
|---|---|---|---|---|
| 1,772,719 A | * | 8/1930 | Johnson | 318/831 |
| 1,828,943 A | * | 10/1931 | Rossman | 388/825 |
| 2,881,338 A | * | 4/1959 | Banning | 310/119 |
| 4,019,104 A | * | 4/1977 | Parker | 318/832 |
| 4,841,188 A | * | 6/1989 | Hao | 310/200 |
| 4,945,296 A | * | 7/1990 | Satake | 318/538 |
| 6,355,997 B1 | * | 3/2002 | Hao | 310/68 E |
| 6,639,338 B1 | * | 10/2003 | Haner | 310/166 |

FOREIGN PATENT DOCUMENTS

JP     01-099494    *   4/1989       H02P 7/38

* cited by examiner

*Primary Examiner*—Marlon T. Fletcher
*Assistant Examiner*—Tyrone Smith
(74) *Attorney, Agent, or Firm*—Allston L. Jones

(57) ABSTRACT

A switch for a variable-speed induction motor includes conductive connecting pieces, a rotary member, and a driving unit. The connecting pieces are mounted in a housing, are adapted to be connected to the induction motor, and have distal contact parts that surround an axis of the housing. The distal contact parts of any two of the connecting pieces form either an angular or height difference therebetween with respect to the axis. The rotary member is rotatable about the axis inside the housing, and is formed with contacting regions that are arranged along the axis and that are in sliding contact with the distal contact parts. The driving unit is operable so as to drive rotation of the rotary member about the axis such that the connecting pieces are bridged selectively and electrically by the contacting regions of the rotary member for varying the speed of the induction motor.

3 Claims, 18 Drawing Sheets

SWITCH FOR A VARIABLE-SPEED INDUCTION MOTOR

BACKGROUND OF THE INVENTION

1. Field of the Invention

The invention relates to a switch, more particularly to a switch for a variable-speed induction motor.

2. Description of the Related Art

Referring to FIG. 1, a conventional switch 1 for a variable-speed induction motor of a ceiling fan is shown to comprise a lower housing part 10, four conductive connecting pieces 11, a stop block 12, a rotary member 13, a stop disc 14, a driving unit, and a pair of rivets 150 for holding together the aforesaid components. The driving unit includes an upper cover part 15, and a biasing member 16, a beaded chain 17, a transmitting plate 18 and a transmitting axle 19 received in the upper cover part 15.

The lower housing part 10 has a top side formed with four angularly spaced apart retaining grooves 101, 102, 103, 104. Since the retaining groove 101 is deeper than the retaining grooves 102, 103, 104, when the connecting pieces 11 are mounted in the retaining grooves 101, 102, 103, 104, one of the connecting pieces 11 is disposed at a lower level with respect to the other connecting pieces 11.

The stop block 12 is disposed in the retaining groove 101, and is stacked on top of the connecting piece 11 in the retaining groove 101.

The rotary member 13 includes an axle 131 made of an insulator material and formed with a polygonal axle hole 1311, and a conductive member 132 that is sleeved on the axle 131 and that includes a ring portion 1321 and a tongue portion 1322 extending upwardly from the ring portion 1321.

The stop disc 14 is formed with a central hole 141, and is disposed on top of the rotary member 13, the lower housing part 10 and the connecting pieces 11.

The transmitting axle 19 includes a disc portion 191, a cylindrical axle portion 192 extending from a top surface of the disc portion 191, and a polygonal axle portion 193 extending from a bottom surface of the disc portion 191. The polygonal axle portion 193 extends through the central hole 141 in the stop disc 14, and engages fittingly the axle hole 1311 in the axle 131 of the rotary member 13.

The transmitting plate 18 is biased by the biasing member 16 to engage the disc portion 191 of the transmitting axle 19.

The beaded chain 17 has one end connected to the transmitting plate 18, and an opposite end extending outwardly of the upper cover part 15. By operating the beaded chain 17, the transmitting plate 18 can be driven to rotate so as to synchronously drive the transmitting axle 19 and the rotary member 13. Each pulling action of the beaded chain 17 results in 90-degree rotation of the rotary member 13. In other words, four consecutive pulling operations are required to rotate the rotary member 13 back to an initial position. When the rotary member 13 rotates for the first time, as shown in FIG. 2A, the switch 1 configures the induction motor of the ceiling fan for high-speed rotation. When the rotary member 13 rotates for the second time, as shown in FIG. 2B, the switch 1 configures the induction motor of the ceiling fan for medium-speed rotation. When the rotary member 13 rotates for the third time, as shown in FIG. 2C, the switch 1 configures the induction motor of the ceiling fan for low-speed rotation. Finally, when the rotary member 13 rotates for the fourth time, the switch 1 is back to its initial position, in which the induction motor of the ceiling fan is deactivated.

The conventional switch 1 has a drawback in that it is limited for application to a variable-speed induction motor having the tapped starting winding configuration illustrated in FIGS. 2A to 2C. As described in U.S. Pat. No. 6,414,412, the tapped starting winding configuration of FIGS. 2A to 2C is disadvantageous in that stability and balance are adversely affected, and vibration and noise are generated during medium-speed and low-speed operations of the variable-speed induction motor. There is thus a need for a switch that can be easily configured for use with different types of variable-speed induction motors.

SUMMARY OF THE INVENTION

Therefore, the object of the present invention is to provide a switch suitable for application to different types of variable-speed induction motors so as to overcome the aforesaid drawback of the prior art.

Accordingly, a switch for a variable-speed induction motor of this invention comprises a housing, a plurality of conductive connecting pieces, a rotary member, and a driving unit. The housing defines an axis. The conductive connecting pieces are mounted in the housing, are adapted to be connected to the induction motor, and have distal contact parts that surround the axis. The distal contact parts of any two of the conductive connecting pieces form at least one of an angular difference and a height difference therebetween with respect to the axis. The rotary member is mounted in the housing, is rotatable about the axis, and is formed with at least three contacting regions that are arranged along the axis and that are in sliding contact with the distal contact parts of the conductive connecting pieces. At least one of the contacting regions has a set of non-contiguous conductive areas, at least one of which extends to one of the conductive areas of an adjacent one of the contacting regions. The driving unit is coupled to the rotary member, extends outwardly of the housing, and is operable so as to drive rotation of the rotary member in the housing about the axis such that the conductive connecting pieces are bridged selectively and electrically by the contacting regions of the rotary member to thereby obtain a plurality of combinations of electrical connections for varying the speed of the induction motor.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
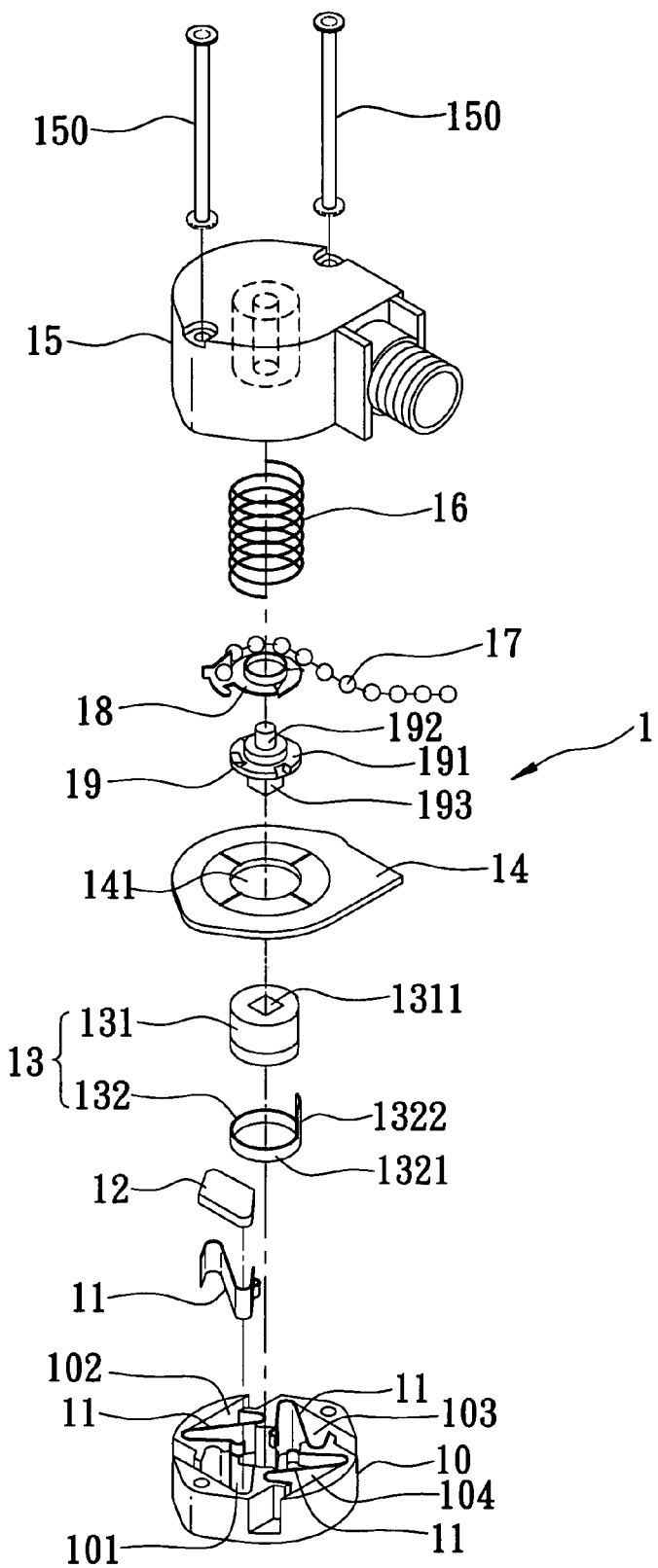
FIG. 1 is an exploded perspective view of a conventional switch for a variable-speed induction motor.
Figure 2A:
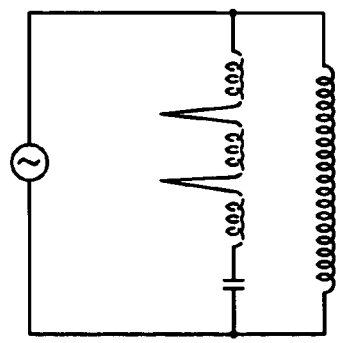
FIGS. 2A, 2B and 2C are circuit diagrams showing different switching states of the switch of FIG. 1 when applied to a known variable-speed induction motor.
Figure 2B:
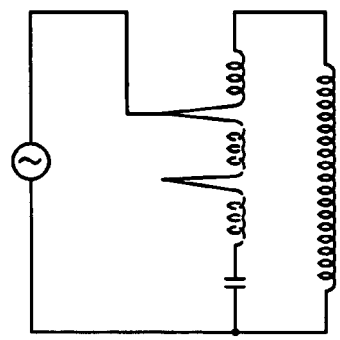
Figure 2C:
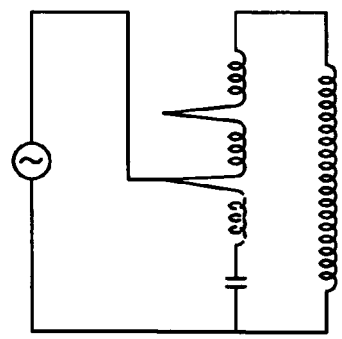
Figure 3:
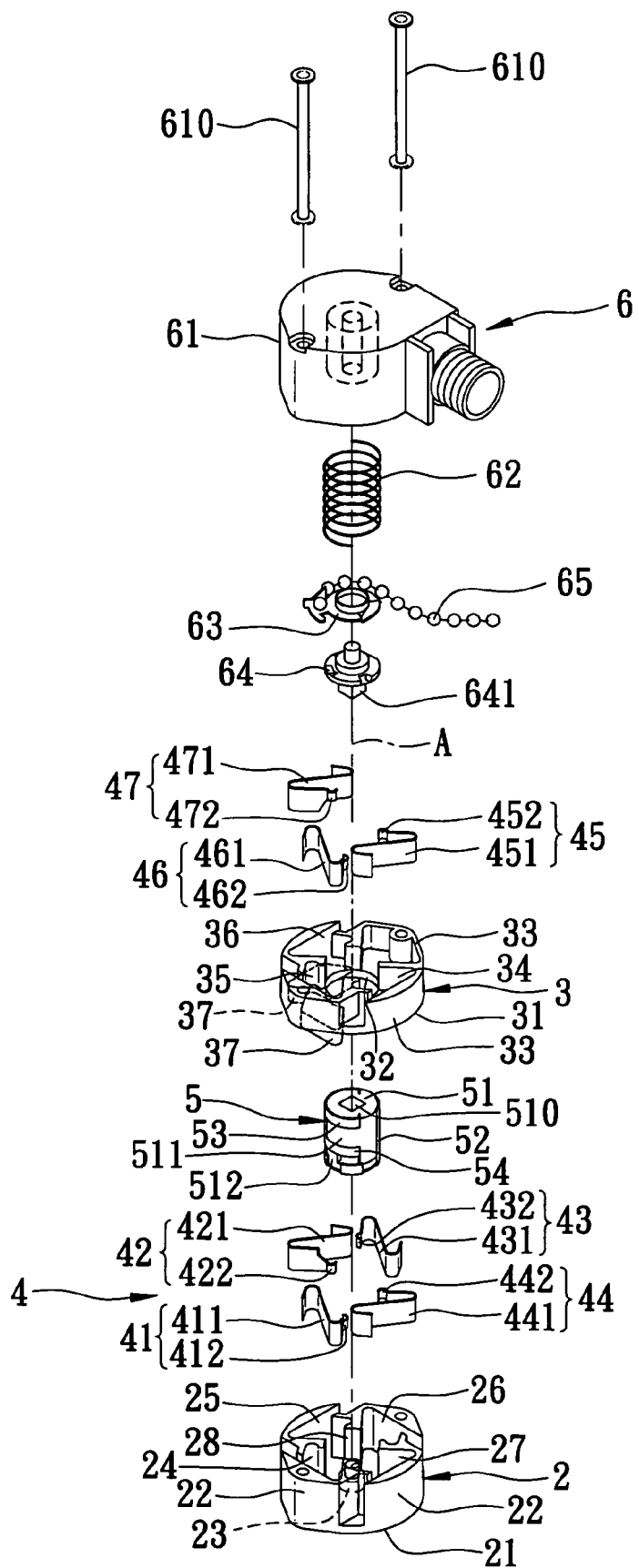
FIG. 3 is an exploded perspective view of the first preferred embodiment of a switch for a variable-speed induction motor according to the present invention.

Referring to FIG. 3, the first preferred embodiment of a switch for a variable-speed induction motor according to the present invention is shown to comprise a housing that includes lower and upper housing parts 2, 3 and that defines an axis (A), a set 4 of conductive connecting pieces, a rotary member 5, a driving unit 6, and a pair of rivets 610 for holding together the aforesaid components.

Figure 6:
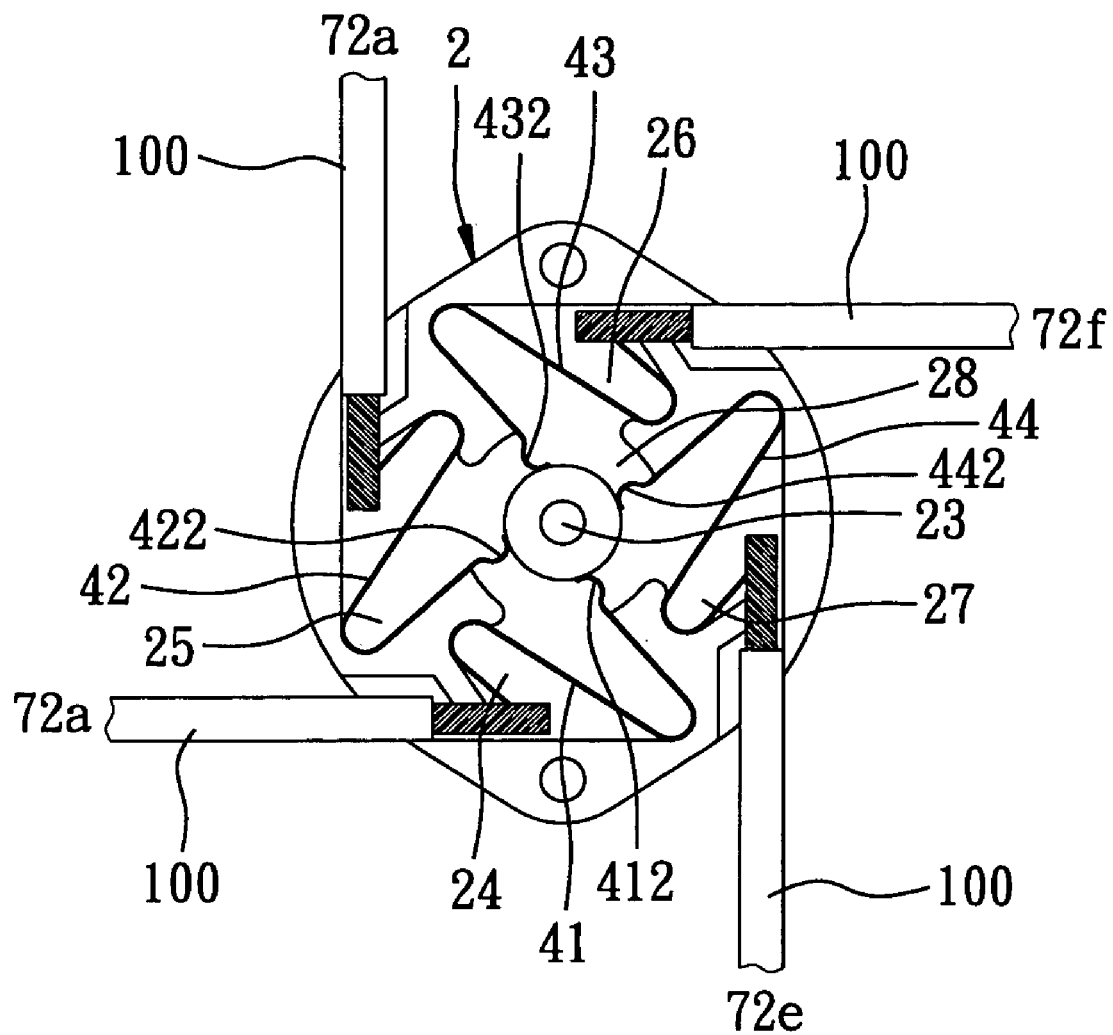
FIG. 6 is a schematic top view to illustrate assembly of a lower housing part and four conductive connecting pieces of the first preferred embodiment.

As shown in FIGS. 3 and 6, the lower housing part 2 includes a base wall 21, four angularly spaced apart side walls 22 that extend upwardly from the base wall 21, and a positioning post 23 that extends upwardly from a center of the base wall 21. The side walls 22 are L-shaped, and are disposed to surround the positioning post 23. Adjacent ones of the side walls 22 define an upwardly opening retaining groove 24, 25, 26, 27 therebetween. The side walls 22 further cooperate to define a central recess 28 above the center of a top surface of the base wall 21. The positioning post 23 is disposed in the central recess 28. In this embodiment, the retaining grooves 24, 25 are deeper than the retaining grooves 26, 27. Moreover, each of the retaining grooves 24, 25, 26, 27 is accessible in a radial direction with respect to a periphery of the base wall 21 for insertion of a respective electrical wire 100.

Figure 7:
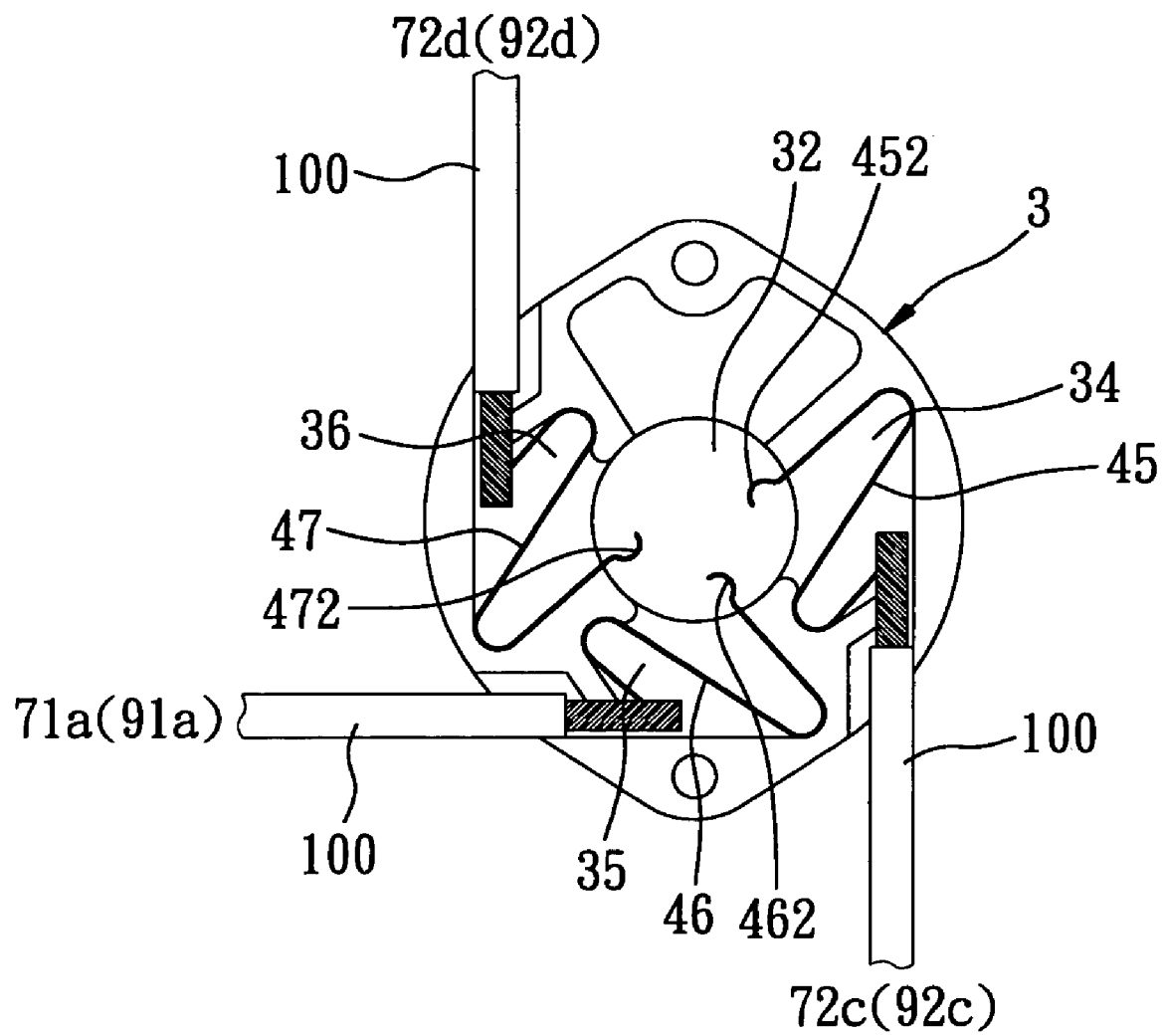
FIG. 7 is a schematic top view to illustrate assembly of an upper housing part and three conductive connecting pieces of the first preferred embodiment.

As shown in FIGS. 3 and 7, the upper housing part 3 is stacked on top of the lower housing part 2, and includes a base wall 31 and four angularly spaced apart side walls 33 that extend upwardly from the base wall 31. The base wall 31 is formed with a through hole 32 that is registered with the positioning post 23 of the lower housing part 2. The side walls 33 are L-shaped, and are disposed to surround the through hole 32. The upper housing part 3 is formed with three retaining grooves 34, 35, 36, each of which is defined by an adjacent pair of the side walls 33. In this embodiment, the retaining groove 35 is deeper than the retaining grooves 34, 36. Moreover, each of the retaining grooves 34, 35, 36 is accessible in a radial direction with respect to a periphery of the base wall 31 for insertion of a respective electrical wire 100.

As shown in FIGS. 3, 6 and 7, the set 4 of conductive connecting pieces includes a first conductive connecting piece 41 retained in the retaining groove 24, a second conductive connecting piece 42 retained in the retaining groove 25, a third conductive connecting piece 43 retained in the retaining groove 26, a fourth conductive connecting piece 44 retained in the retaining groove 27, a fifth conductive connecting piece 45 retained in the retaining groove 34, a sixth conductive connecting piece 46 retained in the retaining groove 35, and a seventh conductive connecting piece 47 retained in the retaining groove 36. Each of the first to seventh conductive connecting pieces 41 to 47 has a body part 411, 421, 431, 441, 451, 461, 471, and a distal contact part 412, 422, 432, 442, 452, 462, 472 extending from the respective body part 411, 421, 431, 441, 451, 461, 471 into the central recess 28 or the through hole 32. The distal contact parts 432, 442, 452, 472 are configured to taper upwardly, where as the distal contact parts 412, 422, 462 are configured to taper downwardly. Moreover, by virtue of the different depths of the retaining grooves 24, 25, 26, 27 in the lower housing part 2 and the retaining grooves 34, 35, 36 in the upper housing part 3, when the conductive connecting pieces 41 to 47 are retained in the retaining grooves 24, 25, 26, 27, 34, 35, 36, the distal contact parts 412, 422, 432, 442, 452, 462, 472 of any two of the conductive connecting pieces 41 to 47 format least one of an angular difference and a height difference therebetween with respect to the axis (A). In particular, the distal contact parts 412, 422 are disposed at a lowermost first level, the distal contact parts 432, 442 are disposed at a second level higher than the first level, the distal contact part 462 is disposed at a third level higher than the second level, and the distal contact parts 452, 472 are disposed at an uppermost fourth level higher than the third level. The upper housing part 3 further includes a pair of protruding blocks 37 that extend downwardly from the base wall 31 such that, when the upper housing part 3 is stacked on top of the lower housing part 2, the protruding blocks 37 press the first and second conductive connecting pieces 41, 42 into the retaining grooves 24, 25, respectively.

Figure 4:
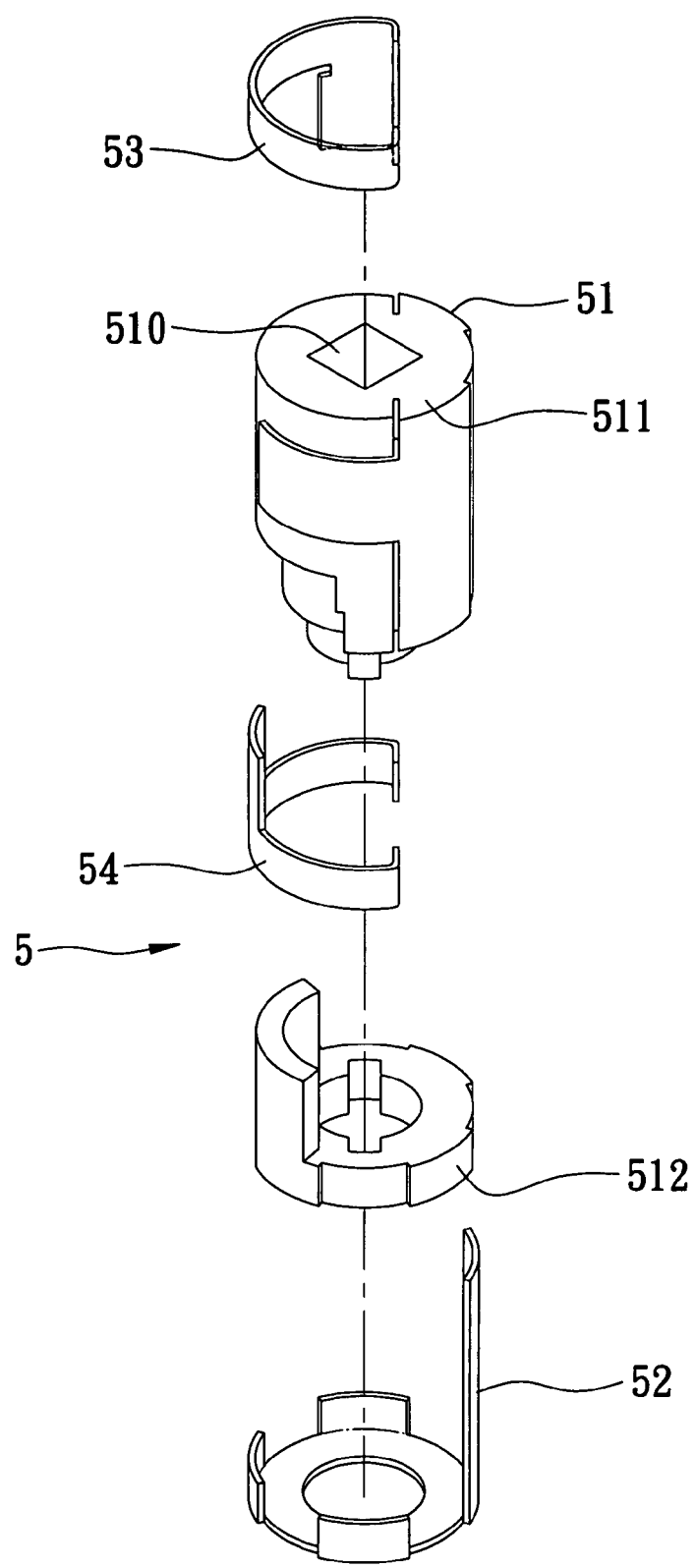
FIG. 4 is an exploded perspective view to illustrate a rotary member of the first preferred embodiment.

As shown in FIGS. 3 and 4, the rotary member 5 is mounted in the housing and is rotatable about the axis (A). Particularly, the rotary member 5 is disposed rotatably in the central recess 28 and the through hole 32, engages rotatably the positioning post 23, and is in contact with the distal contact parts 412, 422, 432, 442, 452, 462, 472 of the conductive connecting pieces 41 to 47. In this embodiment, the rotary member 5 includes an axle 51 made of an insulator material and coupled rotatably to the positioning post 23, and first, second and third conductive members 52, 53, 54 mounted on the axle 51. The conductive members 52, 53, 54 configure an annular outer surface of the axle 51 into at least three contacting regions, which are arranged along the axis (A) and which are in sliding contact with the distal contact parts 412, 422, 432, 442, 452, 462, 472 of the conductive connecting pieces 41 to 47. The axle 51 includes an upper axle portion 511 formed with a polygonal axle hole 510, and a lower axle portion 512. In this embodiment, with further reference to FIG. 8A, the first, second and third conductive members 52, 53, 54 form first to fourth contacting regions (I, II, III, IV) on the outer surface of the axle 51. The first contacting region (I) is disposed to contact slidingly the distal contact parts 412, 422. The second contacting region (II) is disposed to contact slidingly the distal contact parts 432, 442. The third contacting region (III) is disposed to contact slidingly the distal contact part 462. The fourth contacting region (IV) is disposed to contact slidingly the distal contact parts 452, 472. The first conductive member 52 has an L-shaped configuration, and extends along the first through fourth contacting regions (I, II, III, IV). The first conductive member 52 is thus able to establish electrical connection with the distal contact parts 412, 422, 432, 442, 452, 462, 472 at appropriate times. The second conductive member 53 has an L-shaped configuration, and spans the third and fourth contacting regions (III, IV). The second conductive member 53 is thus able to establish electrical connection with the distal contact parts 452, 462, 472 at appropriate times. The third conductive member 54 has a T-shaped configuration, and spans the second and third contacting regions (II, III). The third conductive member 54 is thus able to establish electrical connection with the distal contact parts 432, 442, 462 at appropriate times. Therefore, in this embodiment, due to the shapes and arrangement of the first, second and third conductive members 52, 53, 54, each of the second, third and fourth contacting regions (II, III, IV) is configured with a corresponding set of non-contiguous conductive areas, at least one of which extends to one of the conductive areas of an adjacent one of the contacting regions (I, II, III, IV).

Referring again to FIG. 3, the driving unit 6 includes an upper cover part 61, and a biasing member 62, a beaded chain 65, a transmitting plate 63 and a transmitting axle 64 received in the upper cover part 61. The transmitting axle 64 has a polygonal axle portion 641 that engages fittingly the axle hole 510 in the axle 51 of the rotary member 5. The transmitting plate 63 is biased by the biasing member 62 to engage the transmitting axle 64. The beaded chain 65 has one end connected to the transmitting plate 63, and an opposite end extending outwardly of the upper cover part 61. By operating the beaded chain 65, the transmitting plate 63 can be driven to rotate so as to synchronously drive the transmitting axle 64 and the rotary member 5. Each pulling action of the beaded chain 65 results in 90-degree rotation of the rotary member 5 about the axis (A) such that the conductive connecting pieces 41 to 47 are bridged selectively and electrically by the contacting regions (I, II, III, IV) of the rotary member 5 to thereby obtain a plurality of combinations of electrical connections for varying the speed of an induction motor that is connected to the conductive connecting pieces 41 to 47 via the electrical wires 100 (see FIGS. 6 and 7).

Since the specific construction of the driving unit 6 is known in the art and is not pertinent to the claimed invention, a detailed description of the same is dispensed with herein for the sake of brevity.

With further reference to FIGS. 9A, 9B, 9C and 9D, the switch of the first preferred embodiment is shown to be applicable to a variable-speed induction motor 7 that is of the type disclosed in U.S. Pat. No. 4,841,188. The induction motor 7 includes a run coil 71 and a starting winding 72. The run coil 71 includes two terminals 71a, 71b. The starting winding 72 includes a first speed-changing coil 721 associated with a set of taps 72a, 72c, a second speed-changing coil 722 associated with a set of taps 72d, 72e, and a third speed-changing coil 723 associated with a set of taps 72b, 72f. A starting capacitor 73 is connected across the tap 72b and the terminal 71b.

Figure 9A:
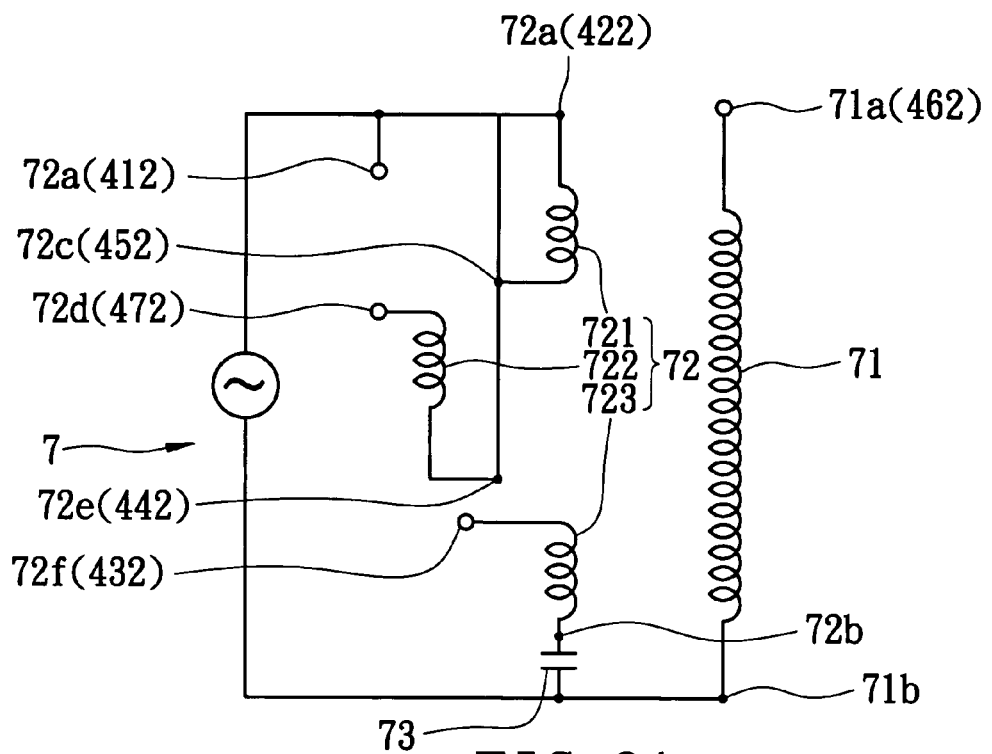
FIGS. 9A to 9D are circuit diagrams showing the different switching states of the first preferred embodiment when applied to a first variable-speed induction motor.

Referring to FIGS. 6, 7 and 9A, with the use of the electrical wires 100, the first and second conductive connecting pieces 41, 42 are connected to the tap 72a, the third conductive connecting piece 43 is connected to the tap 72f, the fourth conductive connecting piece 44 is connected to the tap 72e, the fifth conductive connecting piece 45 is connected to the tap 72c, the sixth conductive connecting piece 46 is connected to the terminal 71a, and the seventh conductive connecting piece 47 is connected to the tap 72d.

Figure 5A:
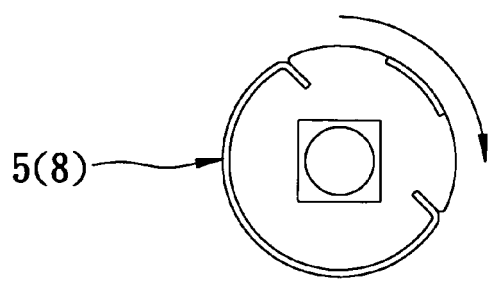
FIGS. 5A to 5D are schematic top views to illustrate four angular positions of the rotary member of the first preferred embodiment.
Figure 8A:
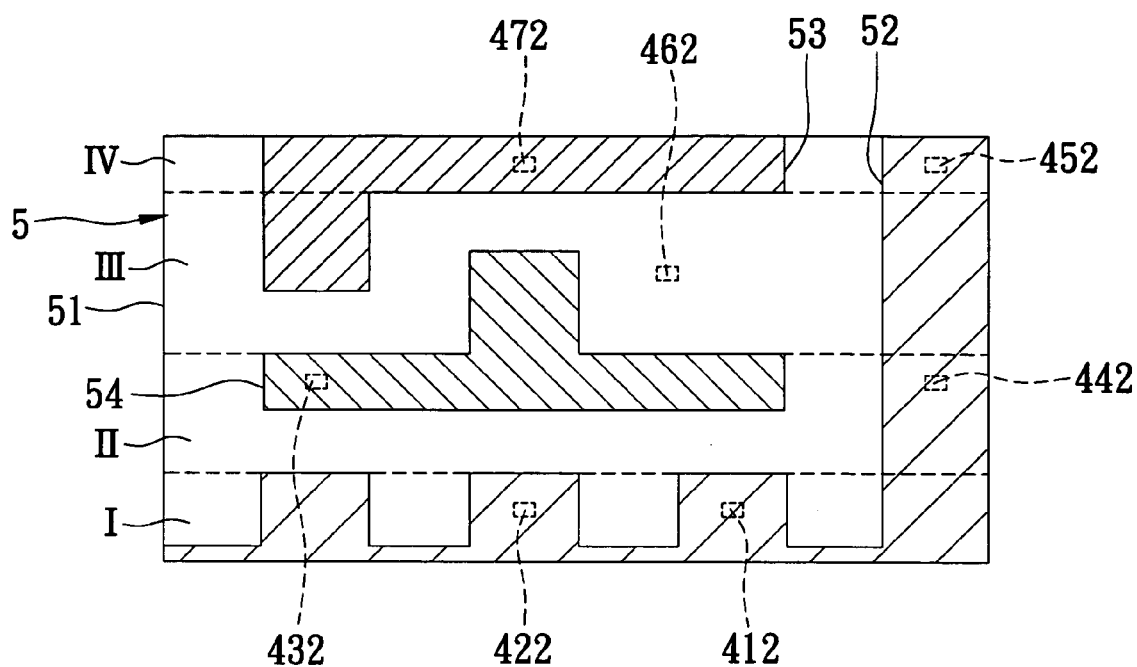
FIGS. 8A to 8D are schematic views to illustrate contacting regions of the rotary member when laid on a flat plane, as well as contact points of the conductive connecting pieces with the contacting regions during the different switching states of the first preferred embodiment.

As shown in FIGS. 5A, 8A and 9A, in an initial OFF state of the induction motor 7, the distal contact parts 412, 422, 442, 452 of the conductive connecting pieces 41, 42, 44, 45 contact the first conductive member 52 such that the taps 72a, 72c and 72e are interconnected. Only the distal contact part 472 of the conductive connecting piece 47 is in contact with the second conductive member 53 (i.e., the tap 72d is in a no-connection state). The distal contact part 462 of the conductive connecting piece 46 is not in contact with any of the conductive members 52, 53, 54 (i.e., the terminal 71a is in a no-connection state). Moreover, only the distal contact part 432 of the conductive connecting piece 43 is in contact with the third conductive member 54 (i.e., the tap 72f is in a no-connection state). Therefore, in the initial OFF state of the induction motor 7, the run coil 71 is disconnected from the first, second and third speed-changing coils 721, 722, 723 of the starting winding 72.

Figure 5B:
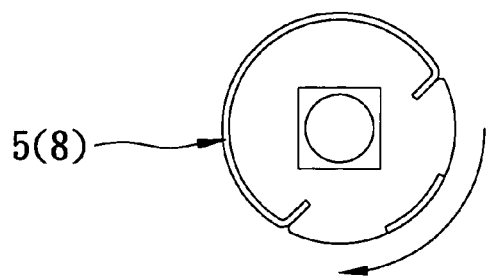
Figure 8B:
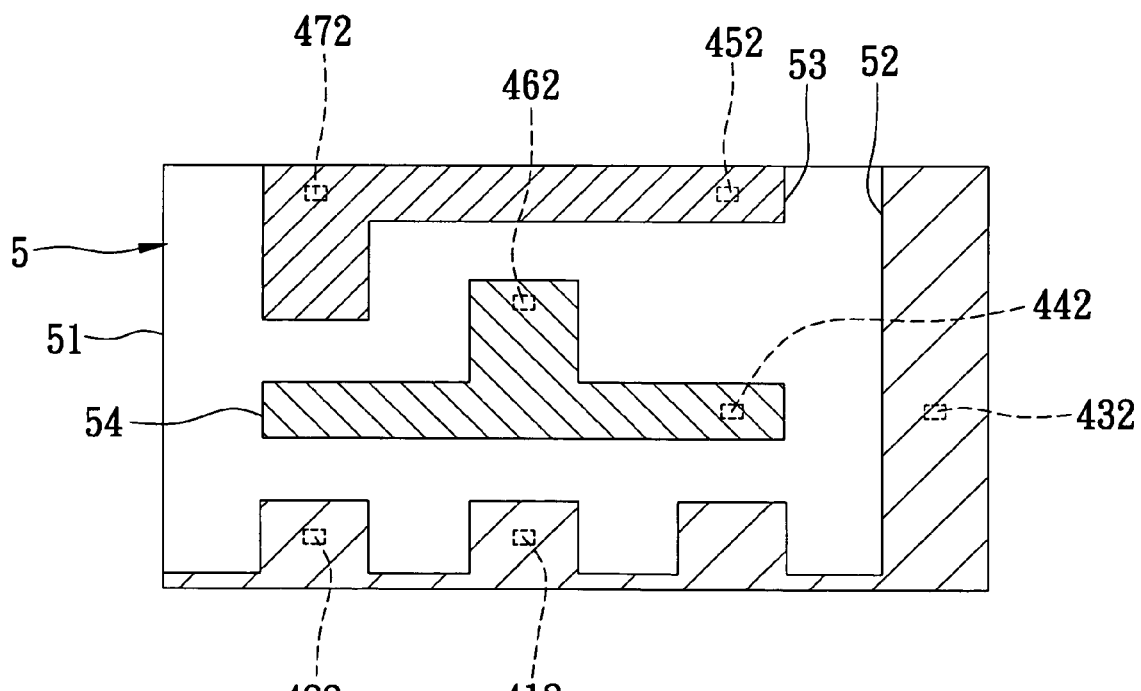
Figure 9B:
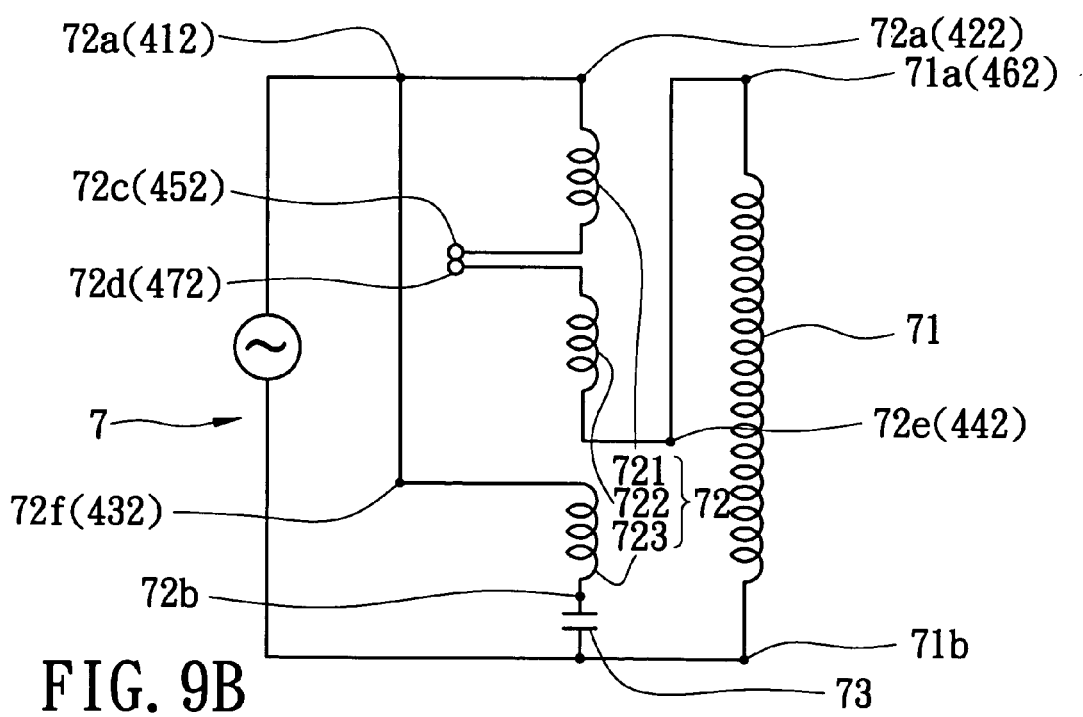

As mentioned hereinabove, each time the beaded chain 65 of the driving unit 6 is pulled, the rotary member 5 rotates by a 90-degree angle due to the transmitting action of the transmitting axle 64. When the beaded chain 65 is operated for the first time, as shown in FIGS. 5B, 8B and 9B, the distal contact parts 412, 422, 432 of the conductive connecting pieces 41, 42, 43 contact the first conductive member 52 such that the taps 72a, 72f are interconnected. The distal contact parts 442, 462 of the conductive connecting pieces 44, 46 contact the third conductive member 54 such that the tap 72e is connected to the terminal 71a. The distal contact parts 452, 472 of the conductive connecting pieces 45, 47 contact the second conductive member 53 such that the taps 72c, 72d are interconnected. In this manner, the run coil 71 is connected in series to the first and second speed-changing coils 721, 722 of the starting winding 72, and the third speed-changing coil 723 is connected across the series combination of the coils 71, 721, 722. The induction motor 7 is configured for low-speed rotation at this time.

Figure 5C:
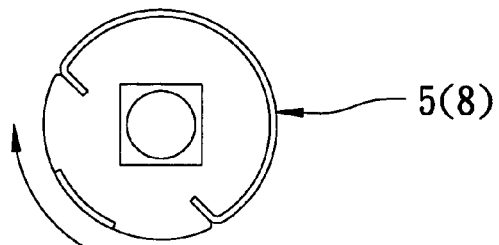
Figure 8C:
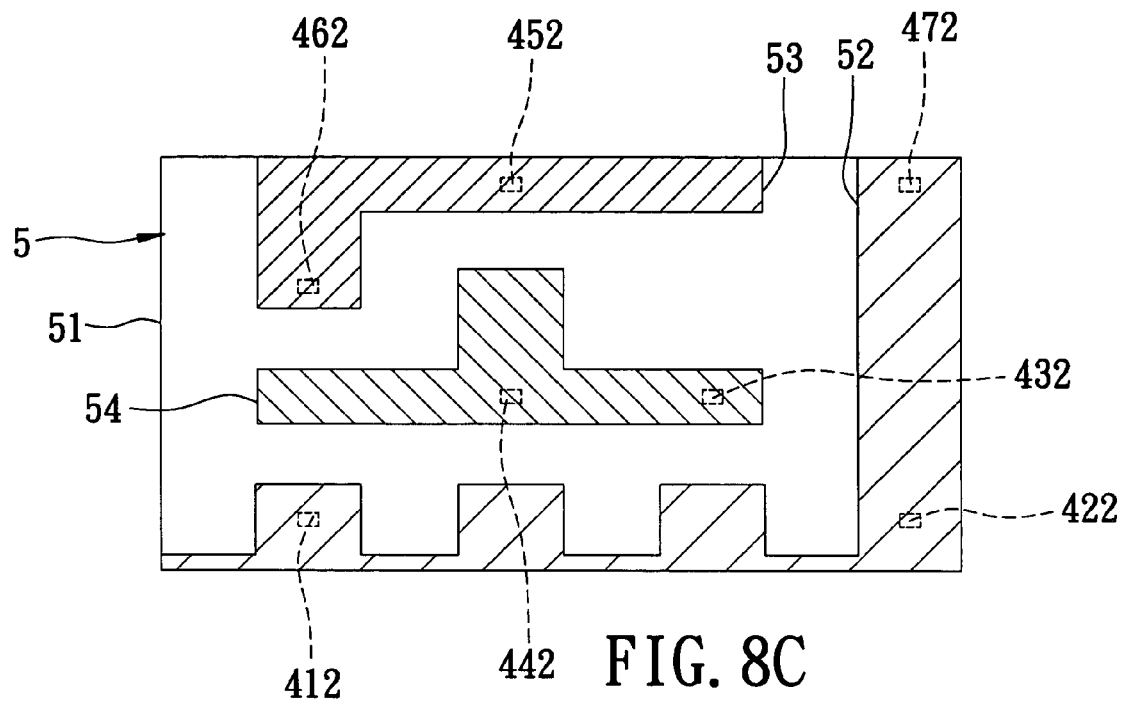
Figure 9C:
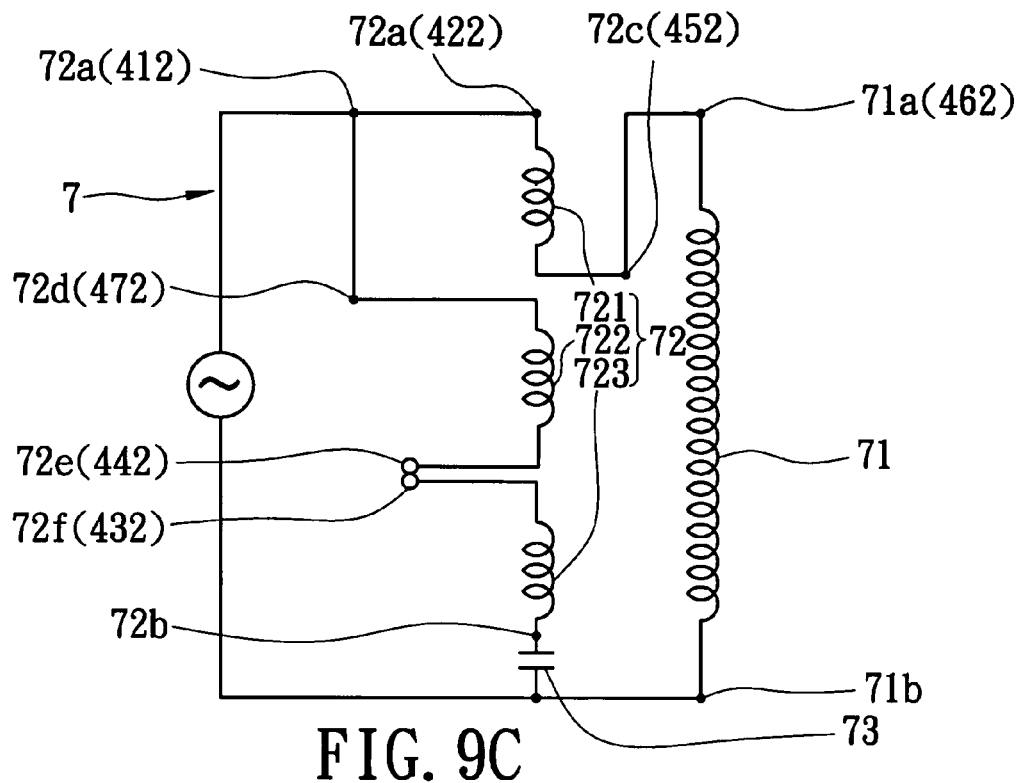

When the beaded chain 65 is operated for the second time, as shown in FIGS. 5C, 8C and 9C, the distal contact parts 412, 422, 472 of the conductive connecting pieces 41, 42, 47 contact the first conductive member 52 such that the taps 72a, 72d are interconnected. The distal contact parts 432, 442 of the conductive connecting pieces 43, 44 contact the third conductive member 54 such that the taps 72e, 72f are interconnected. The distal contact parts 452, 462 of the conductive connecting pieces 45, 46 contact the second conductive member 53 such that the tap 72c is connected to the terminal 71a. In this manner, the run coil 71 is connected in series to the first speed-changing coil 721 of the starting winding 72, and the series combination of the second and third speed-changing coils 722, 723 is connected across the series combination of the coils 71, 721. The induction motor 7 is configured for medium-speed rotation at this time.

Figure 5D:
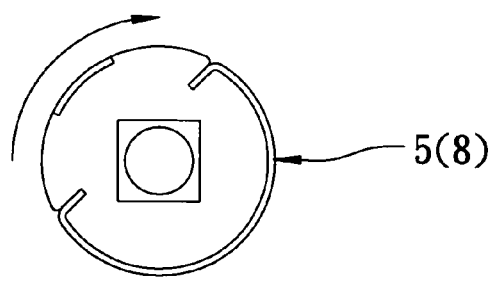
Figure 8D:
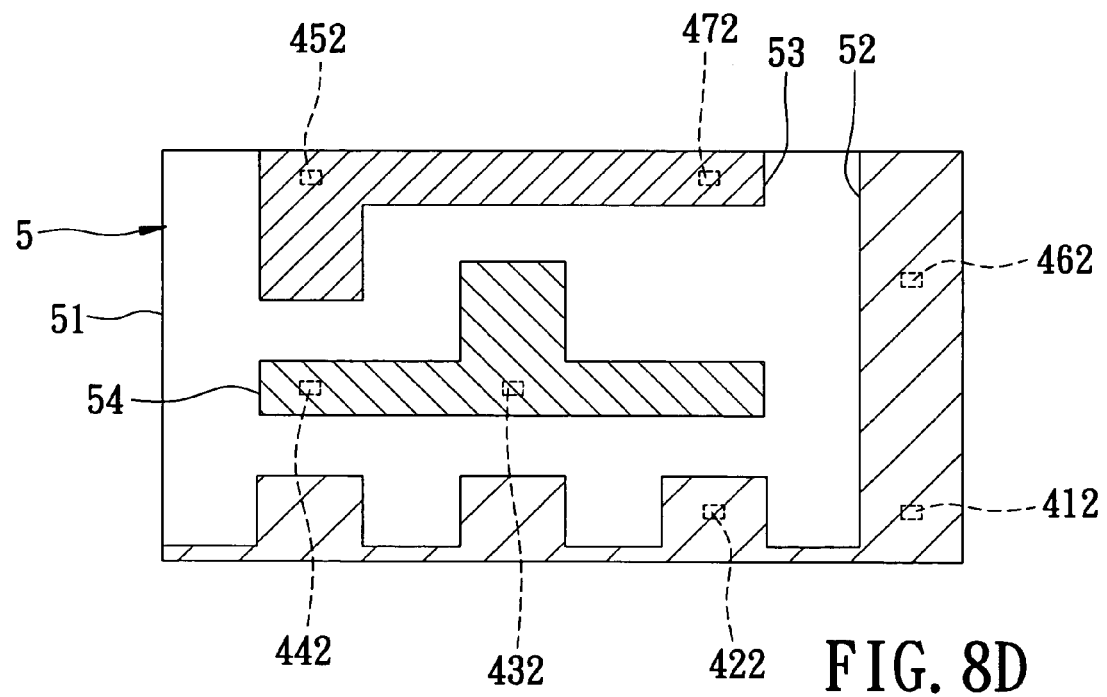
Figure 9D:
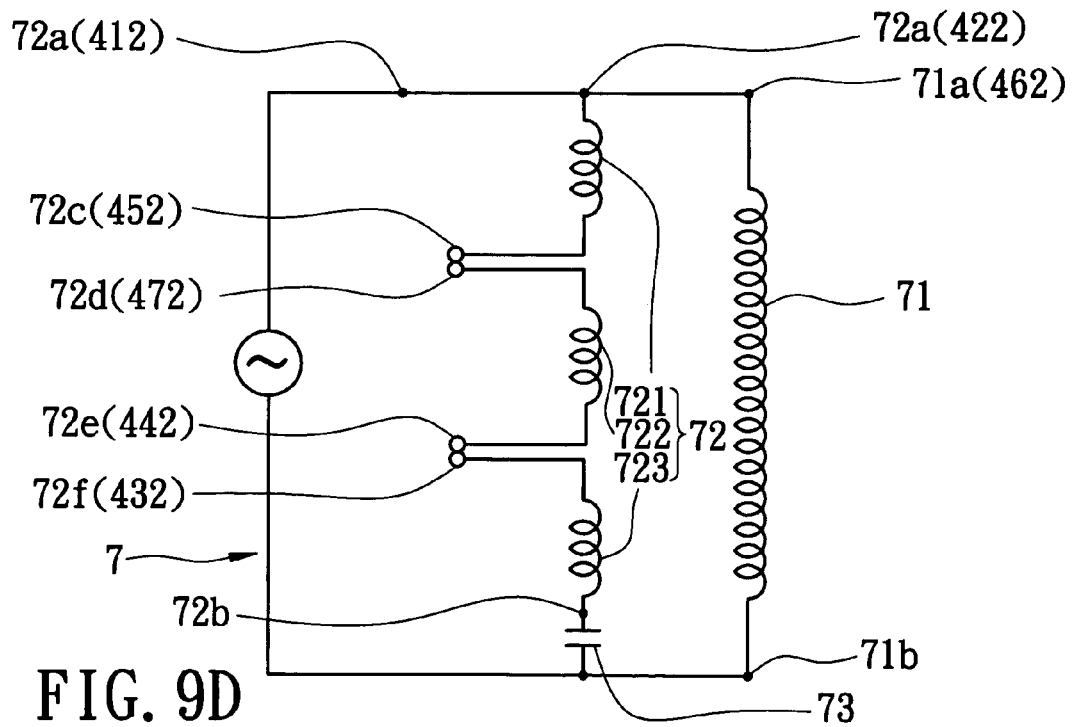

When the beaded chain 65 is operated for the third time, as shown in FIGS. 5D, 8D and 9D, the distal contact parts 412, 422, 462 of the conductive connecting pieces 41, 42, 46 contact the first conductive member 52 such that the tap 72a is connected to the terminal 71a. The distal contact parts 432, 442 of the conductive connecting pieces 43, 44 contact the third conductive member 54 such that the taps 72e, 72f are interconnected. The distal contact parts 452, 472 of the conductive connecting pieces 45, 47 contact the second conductive member 53 such that the taps 72c, 72d are interconnected. In this manner, the run coil 71 is connected across the series combination of the first, second and third speed-changing coils 721, 722, 723 of the starting winding 72. The induction motor 7 is configured for high-speed rotation at this time.

Figure 10:
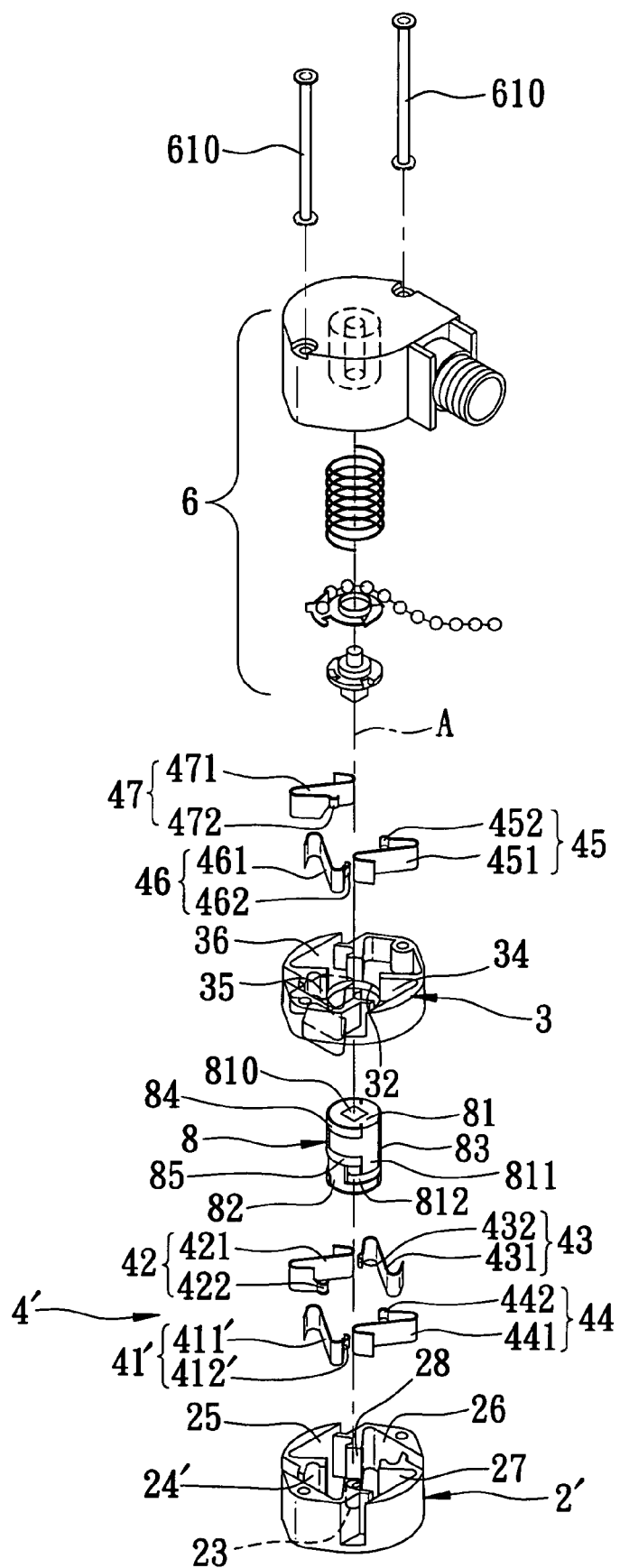
FIG. 10 is an exploded perspective view of the second preferred embodiment of a switch for a variable-speed induction motor according to the present invention.

Referring to FIG. 10, the second preferred embodiment of a switch for a variable-speed induction motor according to the present invention is shown to similarly comprise a housing that includes lower and upper housing parts 2', 3 and that defines an axis (A), a set 4' of conductive connecting pieces, a rotary member 8, a driving unit 6, and a pair of rivets 610 for holding together the aforesaid components. The upper housing part 3 and the driving unit 6 are identical to those of the embodiment described beforehand.

Figure 12:
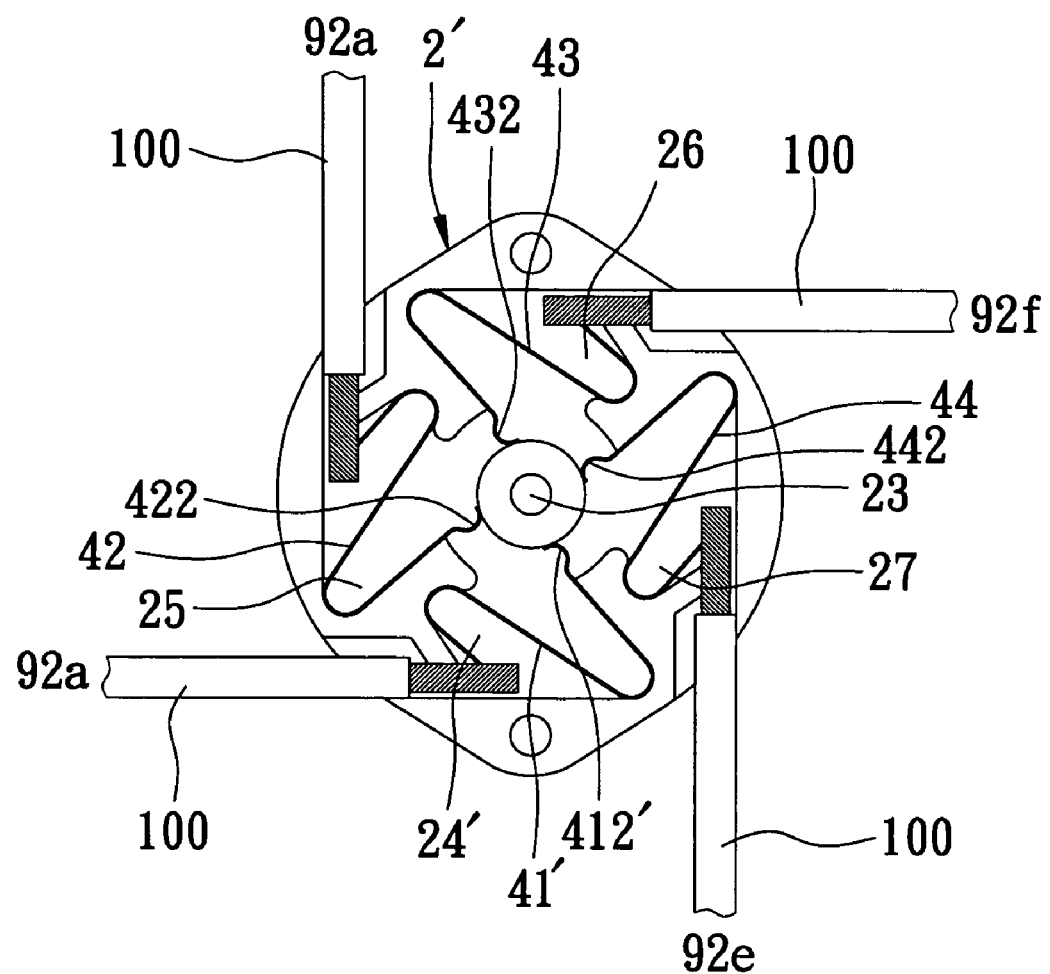
FIG. 12 is a schematic top view to illustrate assembly of a lower housing part and four conductive connecting pieces of the second preferred embodiment.

As shown in FIGS. 10 and 12, the lower housing part 2' differs primarily from the lower housing part 2 of the previous embodiment in that the retaining groove 24' is deeper than the retaining groove 25.

As shown in FIGS. 7, 10 and 12, the set 4' of conductive connecting pieces includes a first conductive connecting piece 41' retained in the retaining groove 24', a second conductive connecting piece 42 retained in the retaining groove 25, a third conductive connecting piece 43 retained in the retaining groove 26, a fourth conductive connecting piece 44 retained in the retaining groove 27, a fifth conductive connecting piece 45 retained in the retaining groove 34, a sixth conductive connecting piece 46 retained in the retaining groove 35, and a seventh conductive connecting piece 47 retained in the retaining groove 36. Each of the first to seventh conductive connecting pieces 41' to 47 has a body part 411', 421, 431, 441, 451, 461, 471, and a distal contact part 412', 422, 432, 442, 452, 462, 472 extending from the respective body part 411', 421, 431, 441, 451, 461, 471 into the central recess 28 or the through hole 32. The distal contact parts 432, 442, 452, 472 are configured to taper upwardly, whereas the distal contact parts 412', 422, 462 are configured to taper downwardly. Moreover, by virtue of the different depths of the retaining grooves 24', 25, 26, 27 in the lower housing part 2' and the retaining grooves 34, 35, 36 in the upper housing part 3, when the conductive connecting pieces 41' to 47 are retained in the retaining grooves 24', 25, 26, 27, 34, 35, 36, the distal contact parts 412', 422, 432, 442, 452, 462, 472 of any two of the conductive connecting pieces 41' to 47 form at least one of an angular difference and a height difference therebetween with respect to the axis (A). In particular, the distal contact part 412' is disposed at a lowermost first level, the distal contact part 422 is disposed at a second level higher than the first level, the distal contact parts 432, 442 are disposed at a third level higher than the second level, the distal contact part 462 is disposed at a fourth level higher than the third level, and the distal contact parts 452, 472 are disposed at an uppermost fifth level higher than the fourth level.

Figure 11:
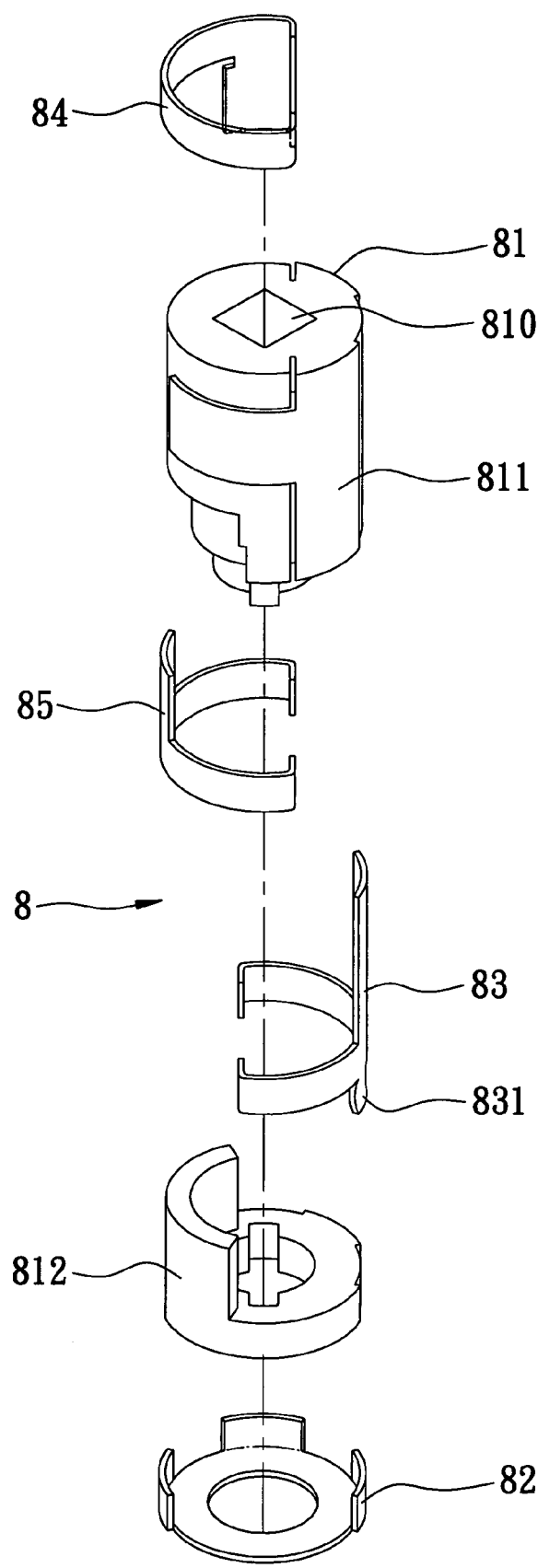
FIG. 11 is an exploded perspective view to illustrate a rotary member of the second preferred embodiment.

As shown in FIGS. 10 and 11, the rotary member 8 is mounted in the housing and is rotatable about the axis (A). Particularly, the rotary member 8 is disposed rotatably in the central recess 28 and the through hole 32, engages rotatably the positioning post 23, and is in contact with the distal contact parts 412', 422, 432, 442, 452, 462, 472 of the conductive connecting pieces 41' to 47. In this embodiment, the rotary member 8 includes an axle 81 made of an insulator material and coupled rotatably to the positioning post 23, and first, second, third and fourth conductive members 82, 83, 84, 85 mounted on the axle 81. The conductive members 82, 83, 84, 85 configure an annular outer surface of the axle 81 into a plurality of contacting regions, which are arranged along the axis (A) and which are in sliding contact with the distal contact parts 412', 422, 432, 442, 452, 462, 472. The second conductive member 83 is formed with a tongue 831 to connect integrally with the first conductive member 82. The axle 81, which is coupled to the driving unit 6 in a manner similar to the first preferred embodiment, includes an upper axle portion 811 formed with a polygonal axle hole 810, and a lower axle portion 812. In this embodiment, with further reference to FIG. 13A, the first, second, third and fourth conductive members 82, 83, 84, 85 form first to fifth contacting regions (P, Q, R, S, T) on the outer surface of the axle 81. The first contacting region (P) is disposed to contact slidingly the distal contact part 412'. The second contacting region (Q) is disposed to contact slidingly the distal contact part 422. The third contacting region (R) is disposed to contact slidingly the distal contact parts 432, 442. The fourth contacting region (S) is disposed to contact slidingly the distal contact part 462. The fifth contacting region (T) is disposed to contact slidingly the distal contact parts 452, 472. The first conductive member 82 has angularly spaced apart portions that extend to the first contacting region (P) and is thus able to establish electrical connection with the distal contact part 412' at appropriate times. The second conductive member 83, which is connected to the first conductive member 82, has a cross-shaped configuration, and extends along the first through fifth contacting regions (P, Q, R, S, T). The second conductive member 83 is thus able to establish electrical connection with the distal contact parts 412', 422, 432, 442, 452, 462, 472 at appropriate times. The third conductive member 84 has an L-shaped configuration, and spans the fourth and fifth contacting regions (S, T). The third conductive member 84 is thus able to establish electrical connection with the distal contact parts 452, 462, 472 at appropriate times. The fourth conductive member 85 has a T-shaped configuration, and spans the third and fourth contacting regions (R, S). The fourth conductive member 85 is thus able to establish electrical connection with the distal contact parts 432, 442, 462 at appropriate times. Therefore, in this embodiment, due to the shapes and arrangement of the first, second, third and fourth conductive members 82, 83, 84, 85, each of the first to fifth contacting regions (P, Q, R, S, T) is configured with a corresponding set of non-contiguous contacting areas, at least one of which extends to one of the contacting areas of an adjacent one of the contacting regions (P, Q, R, S, T).

With further reference to FIGS. 14A, 14B, 14C and 14D, the switch of the second preferred embodiment is shown to be applicable to a variable-speed induction motor 9 that is of the type disclosed in U.S. Pat. No. 6,414,412. The induction motor 9 includes a run coil 91 and a starting winding 92. The run coil 91 includes two terminals 91a, 91b. The starting winding 92 includes a first speed-changing coil 921 associated with a set of taps 92a, 92c, a second speed-changing coil 922 associated with a set of taps 92d, 92e, and a third speed-changing coil 923 associated with a set of taps 92f, 92b. A starting capacitor 93 is connected across the tap 92b and the terminal 91b.

Figure 14A:
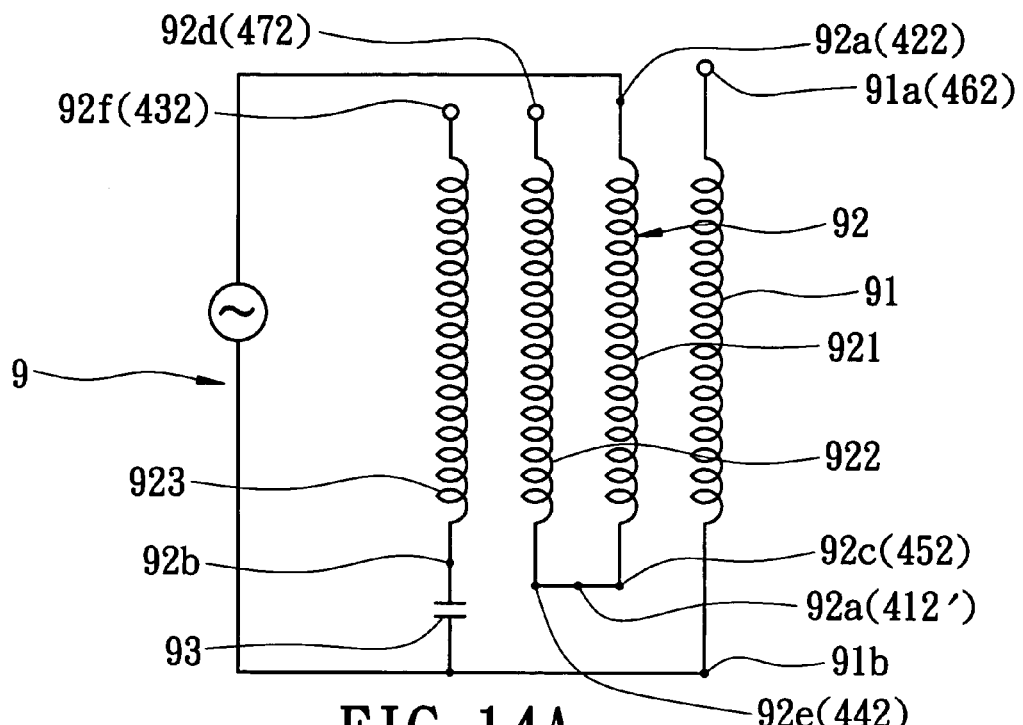
FIGS. 14A to 14D are circuit diagrams showing the different switching states of the second preferred embodiment when applied to a second variable-speed induction motor.

Referring to FIGS. 6, 12 and 14A, with the use of the electrical wires 100, the first and second conductive connecting pieces 41', 42 are connected to the tap 92a, the third conductive connecting piece 43 is connected to the tap 92f, the fourth conductive connecting piece 44 is connected to the tap 92e, the fifth conductive connecting piece 45 is connected to the tap 92c, the sixth conductive connecting piece 46 is connected to the terminal 91a, and the seventh conductive connecting piece 47 is connected to the tap 92d.

Figure 13A:
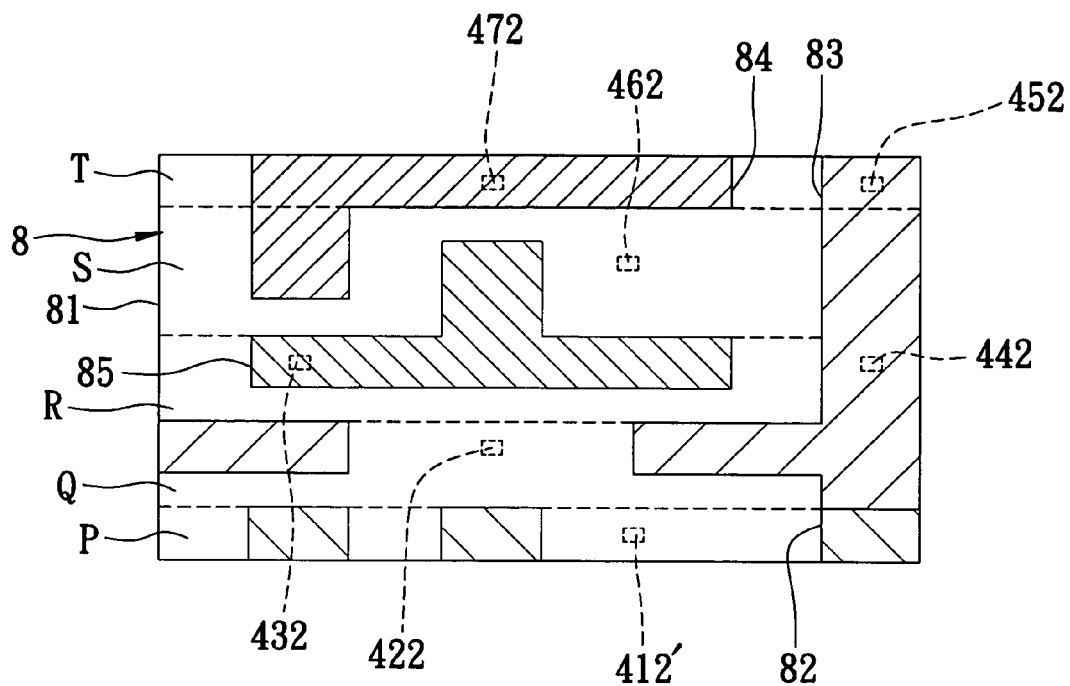
FIGS. 13A to 13D are schematic views to illustrate contacting regions of the rotary member of the second preferred embodiment when laid on a flat plane, as well as contact points of the conductive connecting pieces with the contacting regions during the different switching states of the second preferred embodiment.

As shown in FIGS. 5A, 13A and 14A, in an initial OFF state of the induction motor 9, the run coil 91 is disconnected from the first, second and third speed-changing coils 921, 922, 923 of the starting winding 92.

Figure 13B:
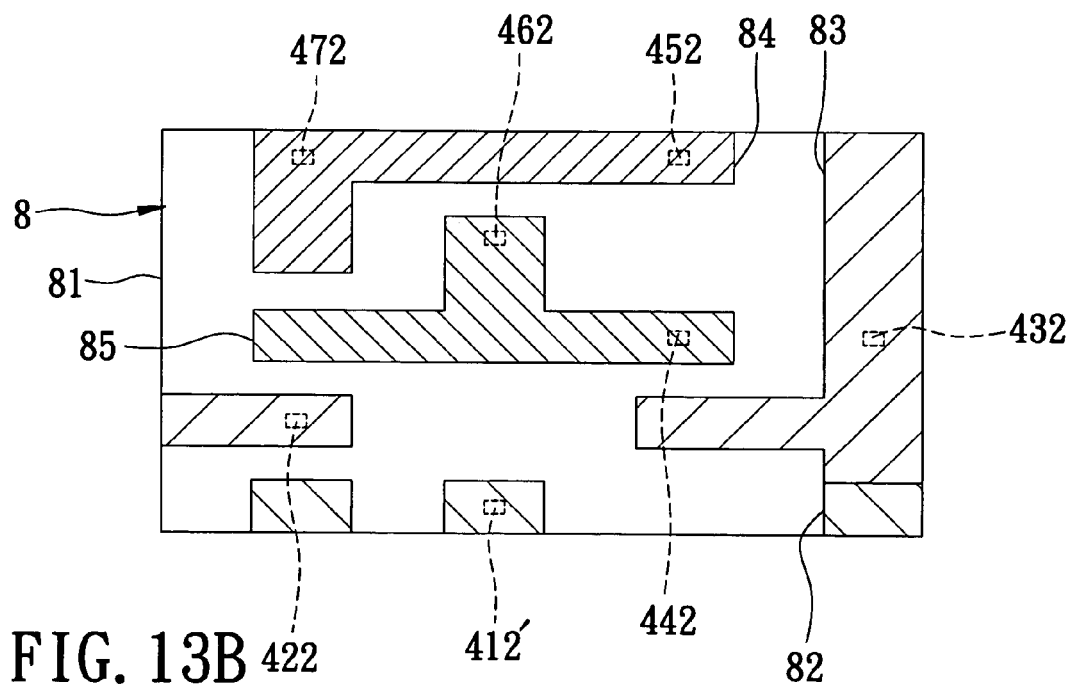
Figure 14B:
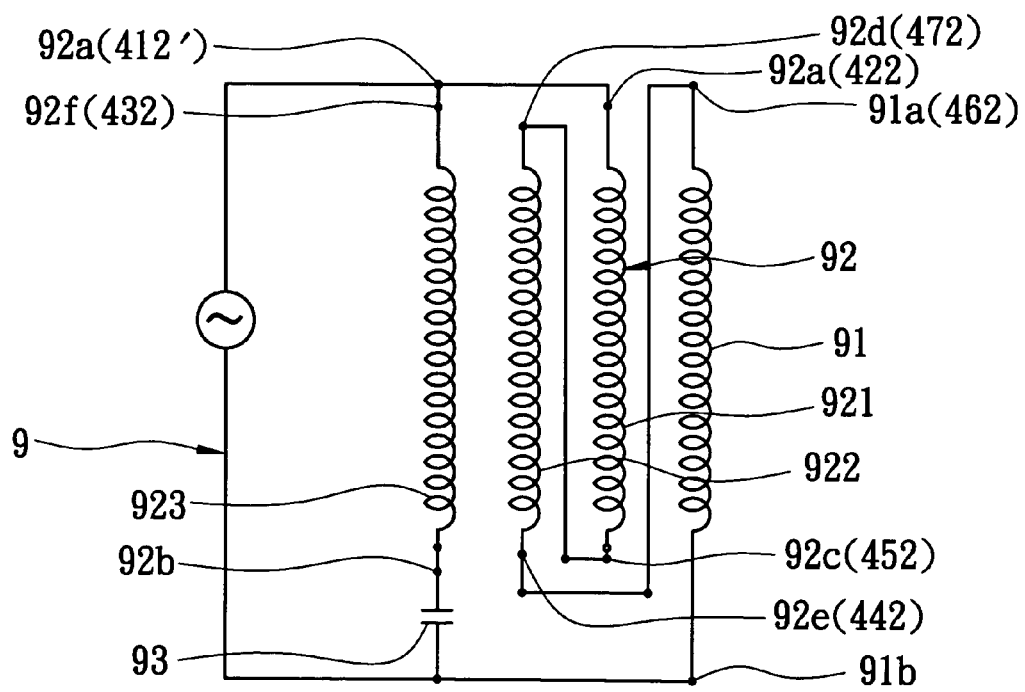

Like the previous embodiment, each time the driving unit 6 is operated, the rotary member 8 is driven to rotate by a 90-degeree angle. When the driving unit 6 is operated for the first time, as shown in FIGS. 5B, 13B and 14B, the distal contact parts 422, 432 of the conductive connecting pieces 42, 43 contact the second conductive member 83 such that the taps 92a, 92f are interconnected. The distal contact parts 442, 462 of the conductive connecting pieces 44, 46 contact the fourth conductive member 85 such that the tap 92e is connected to the terminal 91a. The distal contact parts 452, 472 of the conductive connecting pieces 45, 47 contact the third conductive member 84 such that the taps 92c, 92d are interconnected. In this manner, the run coil 91 is connected in series to the first and second speed-changing coils 921, 922 of the starting winding 92, and the third speed-changing coil 923 is connected across the series combination of the coils 91, 921, 922. The induction motor 9 is configured for low-speed rotation at this time.

Figure 13C:
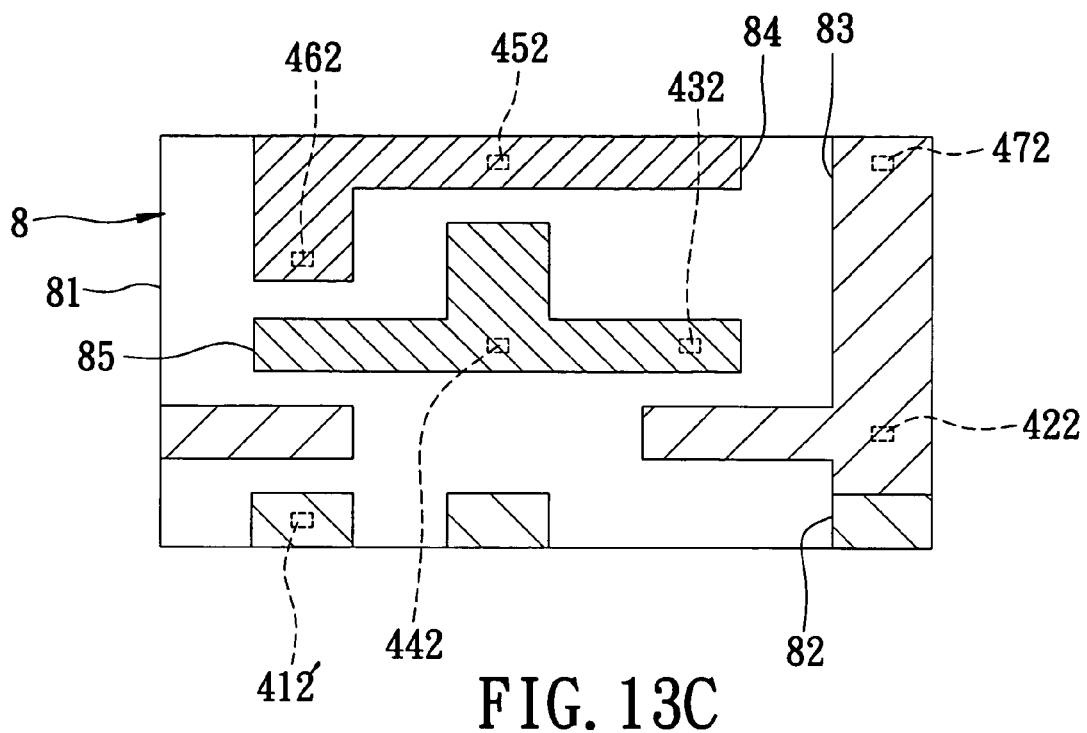
Figure 14C:
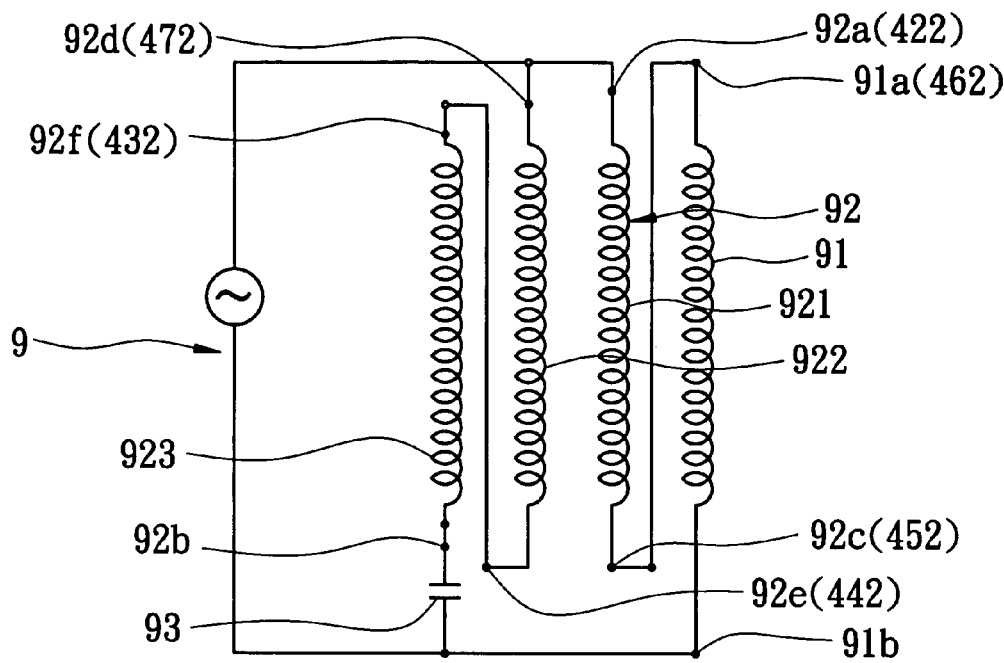

When the driving unit 6 is operated for the second time, as shown in FIGS. 5C, 13C and 14C, the distal contact parts 422, 472 of the conductive connecting pieces 42, 47 contact the second conductive member 83 such that the taps 92a, 92d are interconnected. The distal contact parts 432, 442 of the conductive connecting pieces 43, 44 contact the fourth conductive member 85 such that the taps 92e, 92f are interconnected. The distal contact parts 452, 462 of the conductive connecting pieces 45, 46 contact the third conductive member 84 such that the tap 92c is connected to the terminal 91a. In this manner, the run coil 91 is connected in series to the first speed-changing coil 921 of the starting winding 92, and the series combination of the second and third speed-changing coils 922, 923 is connected across the series combination of the coils 91, 921. The induction motor 9 is configured for medium-speed rotation at this time.

Figure 13D:
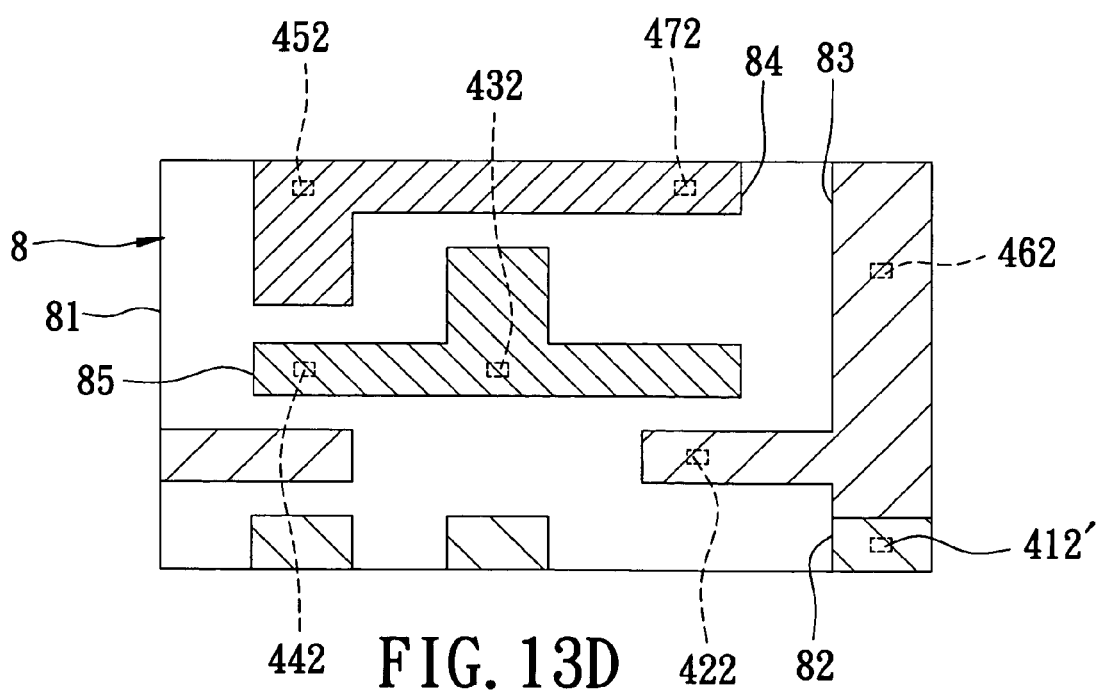
Figure 14D:
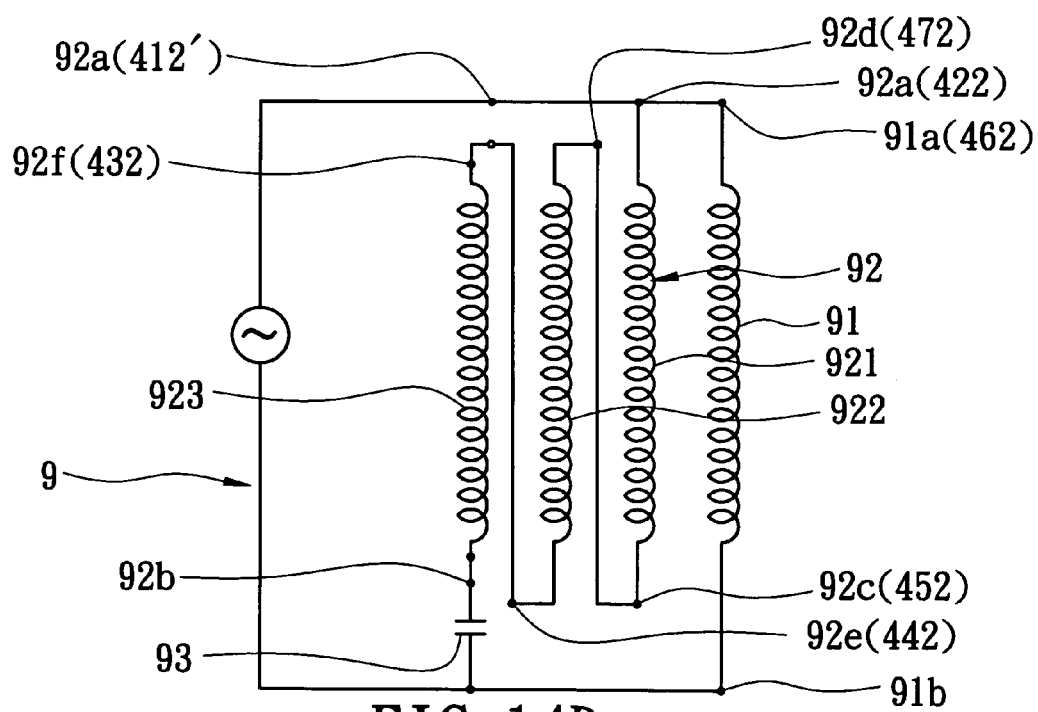

When the driving unit 6 is operated for the third time, as shown in FIGS. 5D, 13D and 14D, the distal contact parts 422, 462 of the conductive connecting pieces 42, 46 contact the second conductive member 83 such that the tap 92a is connected to the terminal 91a. The distal contact parts 432, 442 of the conductive connecting pieces 43, 44 contact the fourth conductive member 85 such that the taps 92e, 92f are interconnected. The distal contact parts 452, 472 of the conductive connecting pieces 45, 47 contact the third conductive member 84 such that the taps 92c, 92d are interconnected. In this manner, the run coil 91 is connected in series across the series combination of the first, second and third speed-changing coils 921, 922, 923 of the starting winding 92. The induction motor 9 is configured for high-speed rotation at this time.

It has thus been shown that the switch of this invention can be easily configured for use with different types of variable-speed induction motors 7, 9.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A switch for a variable-speed induction motor, comprising:

a housing defining an axis;

a plurality of conductive connecting pieces mounted in said housing and adapted to be connected to the induction motor, said conductive connecting pieces having distal contact parts that surround said axis, said distal contact parts of any two of said conductive connecting pieces forming at least one of an angular difference and a height difference therebetween with respect to said axis;

a rotary member mounted in said housing and rotatable about said axis, said rotary member being formed with at least three contacting regions that are arranged along said axis and that are in sliding contact with said distal contact parts of said conductive connecting pieces, at least one of said contacting regions having a set of non-contiguous conductive areas, at least one of which extending to one of said conductive areas of an adjacent one of said contacting regions; and a driving unit coupled to said rotary member, extending outwardly of said housing, and operable so as to drive rotation of said rotary member in said housing about said axis such that said conductive connecting pieces are bridged selectively and electrically by said contacting regions of said rotary member to thereby obtain a plurality of combinations of electrical connections for varying speed of the induction motor.

2. The switch as claimed in claim 1, wherein:

said housing includes a lower housing part and an upper housing part stacked on top of said lower housing part; and said conductive connecting pieces include a lower set of connecting pieces mounted in said lower housing part, and an upper set of connecting pieces mounted in said upper housing part.

3. The switch as claimed in claim 1, wherein said rotary member includes an axle made of an insulator material and having an annular outer surface, and a plurality of conductive members mounted on said axle and forming said contacting regions on said outer surface of said axle.

* * * * *